Patented July 2, 1929.

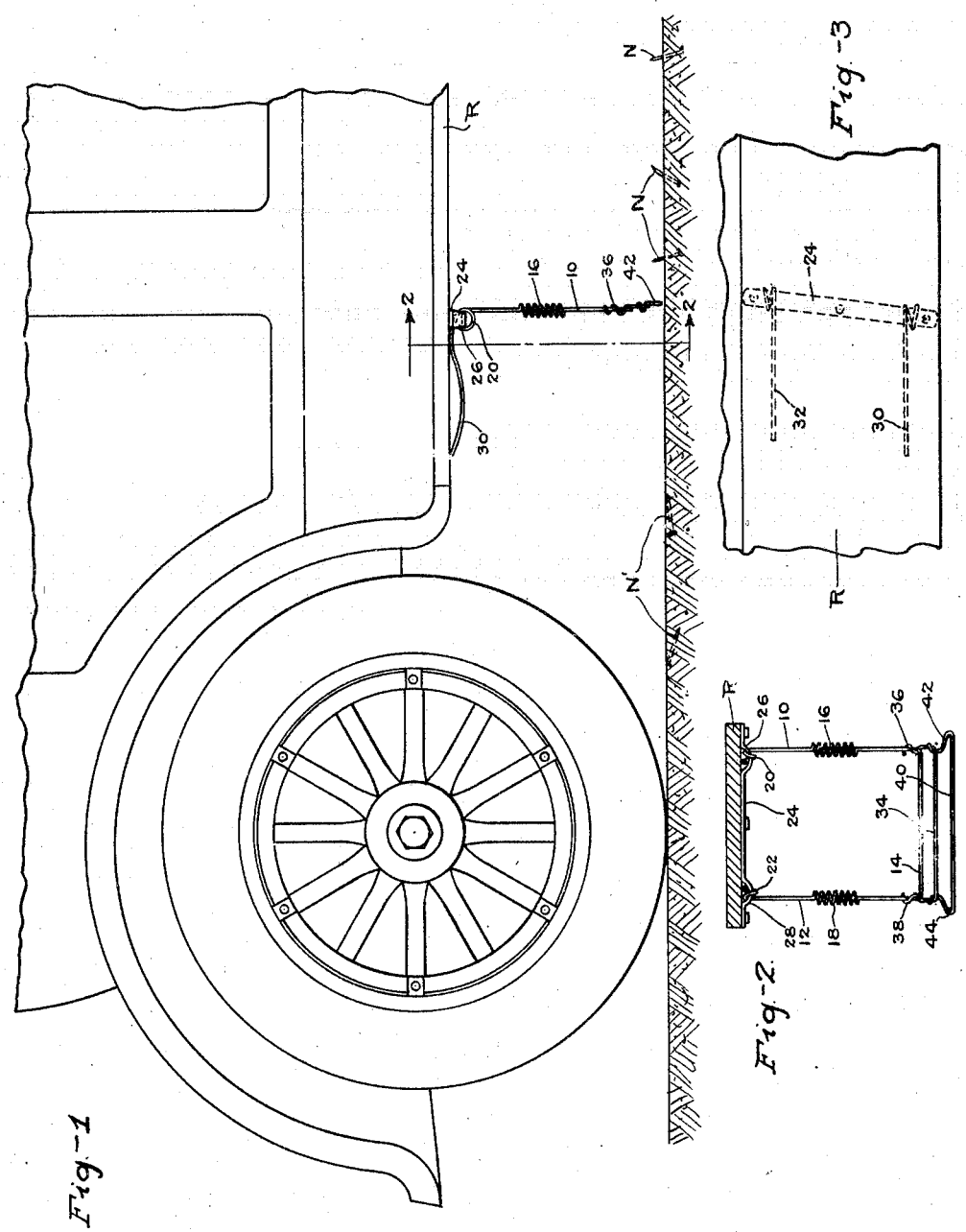

1,719,051

UNITED STATES PATENT OFFICE.

HARRY S. GILLRUP, OF ALBERT LEA, MINNESOTA.

AUTOMOBILE ATTACHMENT.

Application filed June 25, 1927. Serial No. 201,483.

My invention relates to automobile attachments and has for an object in general to prevent automobile tires from being punctured. It is the common experience of automobile drivers that when automobile tires are punctured by nails lying in the roadway, it is in most cases the rear tires which are punctured. I have discovered that this is largely due to the fact that the suction of the automobile causes the nails to be upended after the front wheels have passed over them and that there is not time enough for the upended nails to assume a recumbent position before they are struck by the rear tires, the result being that the rear tires are frequently punctured if there are many nails lying in the roadway as is often the case especially with roadways which have been constructed by the use of dirt wagons. Wagons of this kind become worn and drop some of the nails which were employed in their manufacture. An object, therefore, in particular of my invention is to provide a device which will knock down or remove from the path of the rear wheels, such nails as have been upended. I am aware that it has been proposed to place chains and brushes in such position that they will drag or brush the roadway in front of the automobile wheels but such devices stir up a great deal of objectionable dust which objection is avoided by the employment of my device.

The full objects and advantages of my invention will appear in connection with the detailed description thereof, and the novel features of my inventive idea will be particularly pointed out in the claim.

In the accompanying drawings which illustrate one form in which my invention may be embodied,—

Fig. 1 is a side elevational view showing the rear portion of an automobile with my device applied thereto. Fig. 2 is a view in section on the line 2—2 of Fig. 1. Fig. 3 is a top plan view of a portion of one of the running boards of an automobile with my device secured thereto.

As shown in the drawings, the device comprises an open wire structure in order not to be affected by the resistance of the wind when the automobile is traveling along the highway. In the embodiment shown, the main portion of the device comprises two downwardly extending wire arms 10 and 12 which at their lower ends are connected by a transverse wire member 14. The arms 10 and 12 are formed with coiled portions 16 and 18 in order to provide greater resiliency and the upper ends of said arms are bent to form loops 20 and 22 through which is passed a strip 24. This strip is formed with downwardly bent portions 26 and 28 to accommodate the loops 20 and 22 and these loops merge into rearwardly extending arms 30 and 32 which are curved downwardly as shown in Fig. 1. The strip 24 is secured in suitable manner to the underside of the running board R, it being understood, of course, that the other side of the automobile is likewise equipped. The curved arms 30 and 32 and the loops 20 and 22 aid in making the device more resilient so that if its lower side strikes a bump or stone in the roadway, the device will readily yield in a backward direction, it being noted that the device is mounted far enough in front of the rear wheel so as not to strike the latter. The lower end of the device is so positioned that under proper condition of the road, it will be spaced slightly above the road surface so as not to stir up dust. While the transverse member 14 would act efficiently to a considerable extent for removing nails from the path of the rear wheel if this transverse member were positioned close to the ground, I prefer to make the lower portion of the device slidable vertically so that it may move upwardly when inequalities in the roadway are encountered. In the embodiment which I have shown there are two slidable members. One of these members consists of a transverse rod or wire 34 whose ends 36 and 38 are turned upwardly and looped around the arms 10 and 12 respectively. The other member consists of a transverse wire or rod 40 whose lower ends 42 and 44 are looped around the ends 36 and 38 respectively. This arrangement provides for upward sliding movement of the two transverse members 34 and 40.

The operation and advantages of my invention will be readily understood. In Fig. 1 of the drawings, N designates nails which have been upended and not yet reached by the lower portion of my device while N' designates nails which have been passed over by my device and knocked down before they have been reached by the rear wheel. As shown in Fig. 3, the securing strip 24 may be attached to the running board in inclined position and it will be understood that this causes the lower transverse member of the device to assume the same inclined position the tendency of which is to cause the struck nails to be pushed to the side of the rear wheel. My device can be economically manufactured and can be readily attached to the running boards of automobiles already in use. The device can also be furnished as part of the standard equipment of the automobile.

I claim:

A device of the class described comprising a protecting wire member having two vertical arms, means for yieldingly securing the upper ends of said arms to the underside of the running boards of automobiles in front of the rear wheels thereof, resilient arms extending rearwardly from said vertical arms underneath the running boards, and a cross wire connecting the lower ends of said vertical arms, said cross wire being spaced slightly above the ground.

In testimony whereof I hereunto affix my signature.

HARRY S. GILLRUP.